United States Patent [19]

Young

[11] Patent Number: 4,508,558
[45] Date of Patent: Apr. 2, 1985

[54] COMPOSITIONS CONTAINING UREA, AMMONIA, AND WATER

[75] Inventor: Donald C. Young, Fullerton, Calif.

[73] Assignee: Union Oil Company of California, Los Angeles, Calif.

[21] Appl. No.: 398,389

[22] Filed: Jul. 14, 1982

[51] Int. Cl.$^3$ .................. C05C 9/00; C05C 13/00
[52] U.S. Cl. ........................................ 71/30; 71/64.10
[58] Field of Search ........................... 71/28.30, 64.10

[56] References Cited

U.S. PATENT DOCUMENTS

| | | | |
|---|---|---|---|
| 3,438,764 | 4/1969 | Church | 71/30 |
| 3,515,533 | 6/1970 | Church | 71/30 |
| 3,529,951 | 9/1970 | Every et al. | 71/28 |
| 3,746,528 | 7/1973 | Johnson | 71/30 |
| 4,230,479 | 10/1980 | Richardson | 71/30 |

OTHER PUBLICATIONS

"Physical Properties of Ammonia Solutions", by Worthington et al., *Industrial and Engineering Chemistry*, vol. 44, No. 4, Apr., 1952, pp. 910 to 913.
"Urea—Its Properties and Manufacture", by Chao, Chao's Institute, 3014 Larkwood St., West Covina, Calif., pp. 260 to 278.
"Liquid Fertilizers", by A. V. Slack, Chapter 20 of *Chemistry and Technology of Fertilizers*, ed. Vincent Sauchelli, Reinhold Publishing Corporation, New York, 1960.
"Division S-4—Soil Fertility and Plant Nutrition", by Fenn et al., *Soil Science Society of America Journal*, vol. 40, 1976.

Primary Examiner—Ferris H. Lander
Attorney, Agent, or Firm—Dean Sandford; Gregory F. Wirzbicki

[57] ABSTRACT

Urea-ammonia-water solutions having a total nitrogen content between about 30 and 37 percent by weight commence crystallization at unexpectedly low temperatures. As a result, such solutions, when employed as a fertilizer, remain in the liquid state under a wider range of temperature conditions than heretofore believed possible.

45 Claims, 4 Drawing Figures

SOLUBILITY IN THE SYSTEM
UREA - AMMONIA - WATER

FIG 1

ONE ATMOSPHERIC ISOBARS
UREA-AMMONIA-WATER

FIG 2

SOLUBILITY IN THE SYSTEM
UREA - AMMONIA - WATER

COMPOSITIONS CONTAINING UREA, AMMONIA, AND WATER

BACKGROUND OF THE INVENTION

This invention pertains to liquid compositions of urea, ammonia, and water, and most particularly to liquid fertilizer compositions of urea, ammonia, and water containing relatively high concentrations of total nitrogen content.

Aqueous solutions of ammonia are well-known liquid fertilizers, as are aqueous solutions of urea. Although it would be desirable to prepare such solutions in high concentrations, the practical limit of total nitrogen content for solutions of either ammonia or urea is about 20 percent by weight, but for different reasons. In the case of aqueous ammonia, exceeding the 20 weight percent limit runs into vapor pressure problems, i.e., the vapor pressure of the solution is so high as to cause boiling or vaporization at a temperature within or below an expectable range of ambient temperatures, so that exposure to the atmosphere will cause vaporization and consequent loss of ammonia. Moreover, even if stored in a closed vessel under pressure, much ammonia will still be vaporized and lost when the solution is reduced in pressure upon application to the soil. On the other hand, urea solutions of above 20 weight percent total nitrogen content have solubility problems under cold weather or relatively cold weather conditions. Specifically, highly concentrated urea solutions begin to crystallize or "salt out" at temperatures likely to be encountered in typical agricultural situations. As a result, use of concentrated urea solutions risks unacceptable changes in liquid nutrient content, clogging of delivery systems, changes in viscosity, and unreliability in measuring precise quantities of dissolved fertilizer.

It would, of course, be highly advantageous in agricultural situations if a liquid fertilizer composition were available of relatively high total nitrogen content, i.e., above about 30 weight percent, particularly since the higher the nutrient content, the lower the water content, and thus the greater the amount of nitrogen-containing nutrients which can be held in a given volume and the lower the energy cost in transporting and spreading a given weight of such nutrients. But for the reasons pointed out hereinbefore, solutions containing either urea or ammonia are not agronomically successful when prepared in relatively high total nitrogen contents, and efforts toward the production of fertilizers containing both ammonia and urea in relatively high total nitrogen content have been discouraged—and this despite the fact that combined ammonia-urea solutions would have the advantage of providing both a "contact" fertilizer (i.e., ammonia) that remains fixed at the point of application in the soil and a "mobile" fertilizer (i.e., urea) that travels with the water carrier for about two days.

Figure 1:
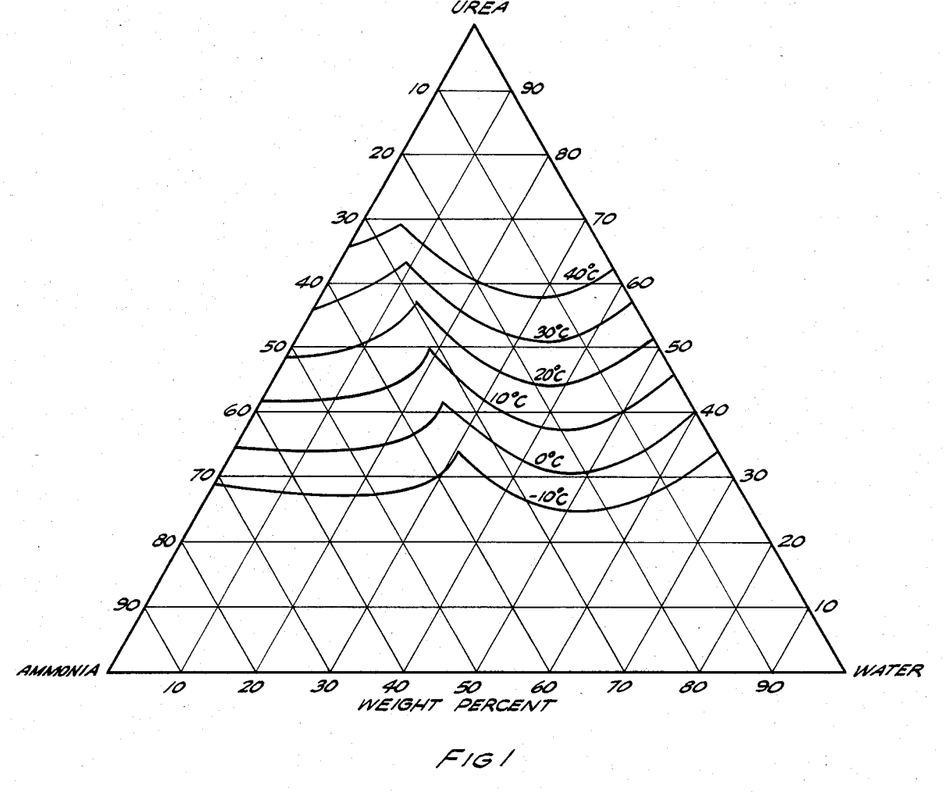
FIG. 1 shows the solubility characteristics in the urea-ammonia-water system at unspecified pressure as reported by E. A. Worthington, R. C. Datin, and D. P. Schutz, *Industrial and Engineering Chemistry*, April, p. 911, (1952).

The reason combined urea-ammonia aqueous solutions have not been prepared in relatively high nitrogen contents may be explained by reference to FIG. 1 of the accompanying drawing, which depicts a ternary phase diagram of the water-urea-ammonia system presented by Worthington, Datin, and Schutz in "Physical Properties of Ammonia Solutions," *Industrial and Engineering Chemistry*, p. 911 (April, 1952). As shown on this phase diagram, as the various isothermal crystallization curves move from right to left and away from the urea-water ordinate in the direction of increasing total nitrogen content, the curves first reach minimum values, then rise toward inflection points, and finally fall off towards the urea-ammonia ordinate. For agricultural purposes, the crystallization curves set forth in FIG. 1 present a dilemma. In the regions wherein crystallization and "salting out" problems are minimized, i.e., generally in the left-hand portion of the graph, and especially in the areas directly under the inflections, it is known that vapor pressures are unacceptably high, so that solutions of compositions defined by concentrations falling within this region would require heavy gauge handling materials and would boil upon exposure to the atmosphere, for example, when held in a tank open to the atmosphere or when applied to the soil. On the other hand, where the vapor pressures are known to be more favorable, i.e., generally in the right-hand portion of the diagram, Worthington et al. predict that the worst solubility conditions exist, and that "salting out" problems will be encountered, with the problems being most acute in the region where the curves reach minimum values.

In addition, the curves in FIG. 1 predict a further disadvantage if one is interested in liquid urea-ammonia-water fertilizers of high urea content. Specifically, although the isothermal crystallization curves run from right to left (which is the direction of increasing total nitrogen content), the minimum values that the curves first reach reveal, if solubility and vapor pressure problems are to be avoided, that the total nitrogen content can only be increased by decreasing the urea content and increasing the ammonia content—a result which would clearly be detrimental if a urea-ammonia-water solution of high "mobile" nitrogen is desired For the foregoing reasons, therefore, liquid urea-ammonia-water fertilizer compositions of relatively high total nitrogen content have been avoided, and aqueous solutions containing either ammonia or urea but not both remain the predominant form of nitrogen-containing liquid fertilizers. These fertilizers, although useful, have not only the disadvantage mentioned hereinbefore—i.e., a practical maximum total nitrogen content of 20 weight percent—but the further disadvantage of requiring substantial heating or cooling facilities for their preparation. More specifically, since the dissolution of ammonia into aqueous media involves exothermic reactions, cooling equipment such as condensers and the like are required for the preparation of aqueous ammonia fertilizers. On the other hand, urea-water reactions are highly endothermic, and consequently, the preparation of aqueous liquid urea fertilizers requires heating means such as boilers and the like.

In view of the drawbacks associated with aqueous liquid fertilizers of either urea or ammonia, it can be seen that there is a need for an aqueous fertilizer of higher total nitrogen content than is commercially possible with urea or ammonia, and a further need for producing such a fertilizer with a minimum energy expenditure for heating and/or cooling. Further still, a need exists for providing a fertilizer whose crystallization and boiling points are such that the differential therebetween is attractive agronomically, allowing for storage, transportation, and application to the soil under atmospheric pressure and within a relatively wide range of ambient temperatures.

Accordingly, it is an object of the present invention to provide liquid urea-ammonia-water fertilizers having a relatively high total nitrogen content, i.e., above about 30 percent by weight, and further having an unexpectedly low crystallization temperature.

It is an especial object of the invention to provide liquid fertilizer compositions comprising urea, ammonia, and water which contain a relatively high total nitrogen content and have an unexpectedly high differential between their crystallization and boiling point temperatures.

It is still another object to provide such compositions having the yet further advantage of higher urea content than heretofore believed possible.

In addition, another object of the invention is to provide a method for storing or transporting such liquid fertilizer compositions in closed vessels under essentially atmospheric pressure, and also a method for applying such fertilizers to the soil without substantial loss due to crystallization or vaporization.

And yet another object of the invention is to provide a method for preparing liquid urea-ammonia-water compositions while minimizing energy expended for heating and/or cooling, with still another object being to provide a fertilizer of superior properties for a given distribution of absolute total nitrogen to the soil.

These and other objects of the invention will become apparent to those skilled in the relevant art in view of the following description of the invention.

SUMMARY OF THE INVENTION

It has now been discovered that certain urea-ammonia-water compositions of relatively high total nitrogen content have unexpectedly low temperatures of crystallization. Specifically, it has been found that urea-ammonia-water compositions of total nitrogen content between about 30 and about 37 weight percent have substantially lower temperatures of crystallization than heretofore known or predicted.

Figure 3:
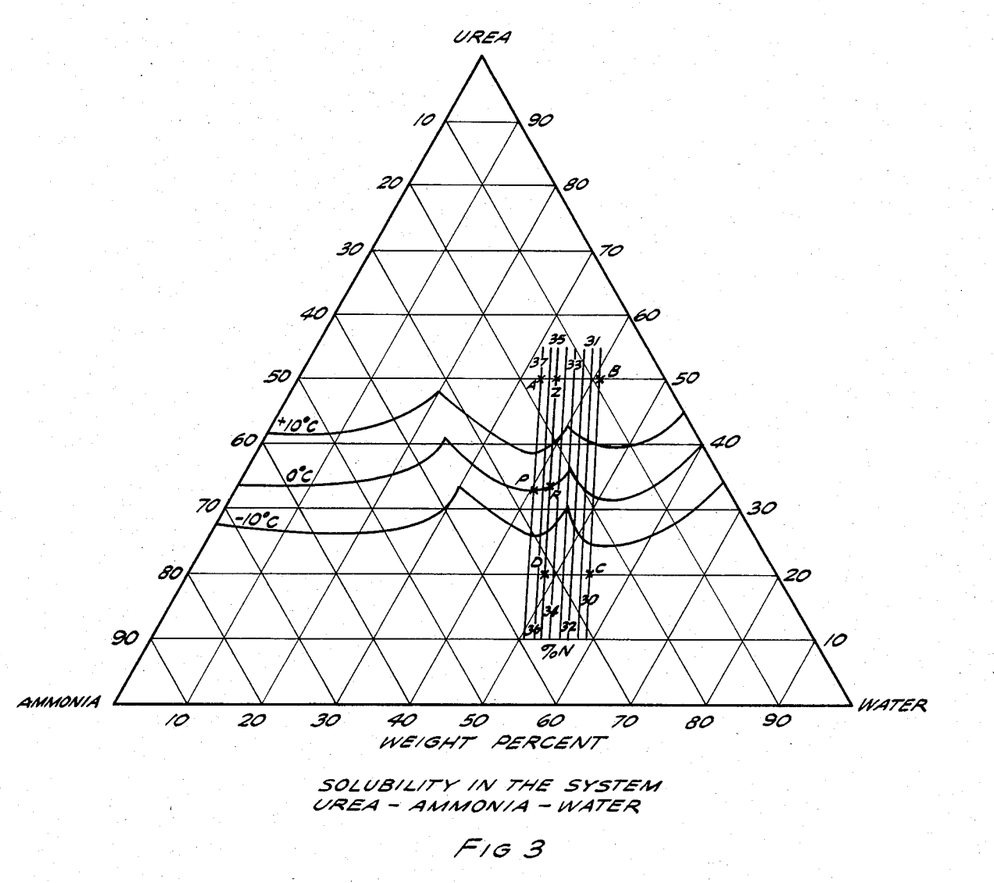
FIG. 3 is a ternary composition diagram of the ammonia-urea-water system illustrating the depression in crystallization temperatures as discovered in the invention for 30 to 37 weight percent total nitrogen urea-ammonia-water compositions. Shown on FIG. 3 are crystallization isotherms at +10° C., 0° C., and −10° C., with the isotherm curves between the constant total nitrogen lines of 30 and 37 weight percent being based on data derived experimentally at atmospheric pressure.

When represented on a urea-ammonia-water ternary diagram, as in FIG. 3 of the drawing, the unexpected depression in crystallization temperatures is shown as a second family of inflections in the isothermal crystallization curves, with the inflections beginning at a total nitrogen value of about 30 weight percent and ending at a value of about 37 weight percent. The maximum values in these inflections, reflecting the greatest depression in crystallization temperature, lie generally in that area of the ternary diagram where the total nitrogen content is between 30 and 35 weight percent, and typically between 32 and 34 weight percent. For many compositions, the maximum values of the inflections fall upon or close to the value of 33 weight percent total nitrogen.

From an agricultural standpoint, the discovery of the new family of inflections is of most interest and importance when the urea-ammonia-water composition contains between 20 and 50 weight percent urea, such compositions having both crystallization and vapor pressure properties conducive to maintaining a relatively high total nitrogen content composition in the liquid state over wide ranges of ambient conditions. Accordingly, in one embodiment of the invention, there is provided a composition, of primary utility as a fertilizer in the essentially completely liquid form, which comprises urea, ammonia, and water, has a urea content between 20 and 50 weight percent, and further has, as a result of dissolved urea and ammonia, a total nitrogen content from 30 to no more than about 37 weight percent and a crystallization temperature at or above 0° C. when the total nitrogen content is above about 35 weight percent.

Figure 4:
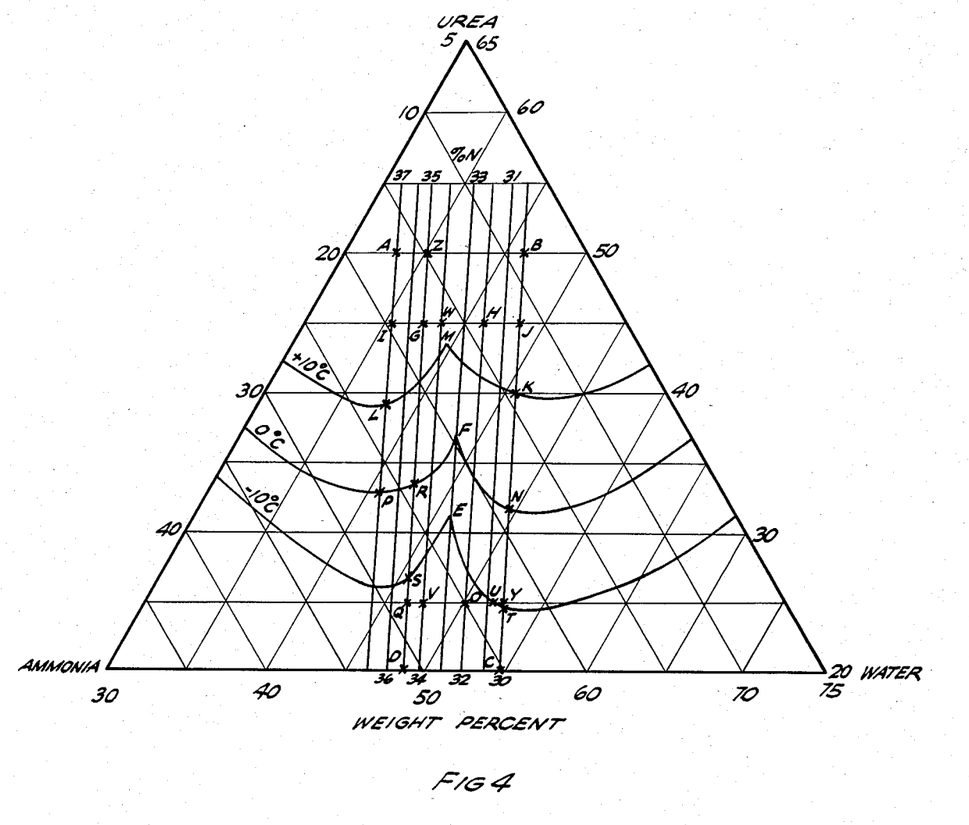
FIG. 4 magnifies a portion of the ternary diagram shown in FIG. 3, with points A, B, C, D, R, P, and Z being identical points (and denoting identical compositions) in both Figures.

These compositions fall within the area defined by lines PA, AB, BC, CD, DR, and curve RP of the urea-ammonia-water ternary diagrams shown in FIGS. 3 and 4. Among the preferred fertilizer compositions are those containing urea, ammonia, and water having a urea content between 20 and 50 weight percent and a total nitrogen content of at least 30 weight percent but no more than 35 weight percent, such compositions falling within the area defined by polygon ZBCD of FIGS. 3 and 4.

Figure 2:
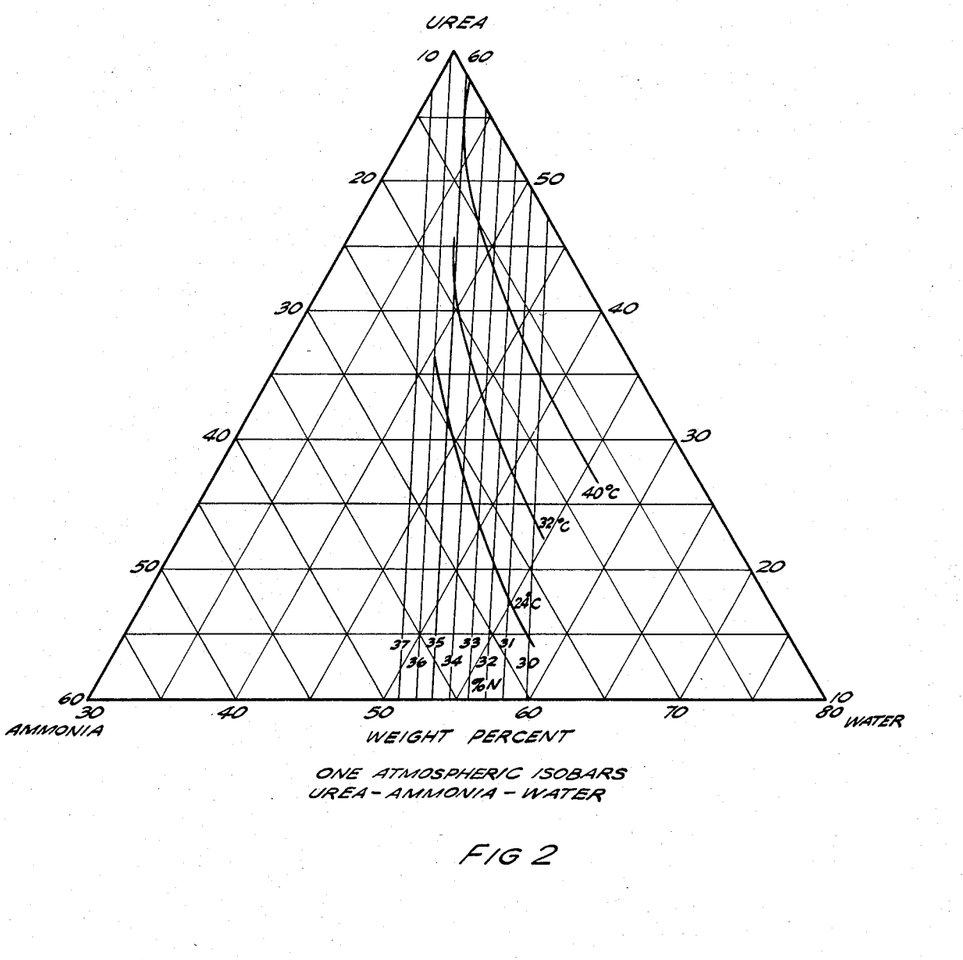
FIG. 2 is a portion of the ternary composition diagram of ammonia, urea, and water having shown thereon one atmosphere isobars at 40° C. (104° F.), 32° C. (89.6° F.), and 24° C. (75.2° F.), the data being derived experimentally.

Due to the lower than expected crystallization or "salting out" temperature of urea-ammonia-water compositions of relatively high total nitrogen content between about 30 and 37 weight percent, the temperature differential between the crystallization and boiling point temperatures of these compositions allows for their use in an essentially completely liquid form throughout a wider range of climactic conditions than previously predictable from the graphs shown in FIGS. 1 and 2 of the drawing (with the graphs showing the crystallization properties reported by Worthington et al. (FIG. 1) and experimentally derived isobaric data at one atmosphere (FIG. 2) for urea-ammonia-water compositions). Accordingly, the invention provides a method for storing in a closed vessel, over a wider range of predetermined temperatures than predictable from FIGS. 1 and 2, an essentially completely liquid urea-ammonia-water composition having a total nitrogen content between about 30 and 37 weight percent, and more particularly between about 30 and 35 weight percent total nitrogen, without encountering crystallization problems or inducing within the closed vessel a superatmospheric pressure. Alternatively, such compositions may be stored in an open vessel, or applied to the soil, or otherwise subjected to an environment wherein atmospheric pressure prevails, but over a wider range of predetermined temperatures than predictable from the graphs of FIGS. 1 and 2 without substantial loss of dissolved nitrogen components due to crystallization or volatilization problems. The compositions herein, therefore, have crystallization and vapor pressure properties of especial usefulness in agriculture, allowing for the transportation, storage, and application as a liquid of urea-ammonia-water compositions of relatively high nitrogen content over a wider range of temperature conditions than heretofore believed possible.

Moreover, the invention also provides a method for preparing liquid urea-ammonia-water compositions wherein advantage is taken of the exothermic heat generated by the dissolution of ammonia to aid in dissolving urea. In this method, the need for heating and/or cooling equipment is minimized or eliminated, as the ammonia and urea may be added simultaneously in amounts such that both dissolve under isothermal temperature conditions or within an acceptable range of temperature increases or decreases requiring a minimum of added energy expenditure for heating and/or cooling. In some cases, no added energy (as for example, by the combustion of a fossil fuel) is required to effect the dissolution of the ammonia and/or urea components required in the compositions of the invention.

In addition, it has been found that, when distributed upon the soil, a 30 to 37 weight percent total nitrogen urea-ammonia-water composition—and particularly those containing between 20 and 50 weight percent urea—prove unexpectedly superior as a fertilizer to other nitrogen-containing fertilizers employed in comparable amounts.

DETAILED DESCRIPTION OF THE INVENTION

In the present invention, liquid urea-ammonia-water solutions, primarily useful as a fertilizer, have been discovered which have unexpectedly low crystallization temperatures. These compositions have a relatively high total nitrogen content between about 30 and about 37 weight percent, and their crystallization properties are such that, when plotted on a urea-ammonia-water ternary diagram, the crystallization isotherms form a family of discontinuities or inflections, as shown by a comparison of FIGS. 1 and 3, in the same general location where Worthington et al. predict or project minimum values. The significance of this discovery is that, contrary to previous predictions or projections, the urea-ammonia-water compositions of 30 to 37 weight percent total nitrogen content remain essentially completely liquid over not only unexpectedly wide temperature spans but over temperature spans rendering the compositions suitable as a commercial liquid fertilizer.

The unexpected depression in the crystallization temperature of urea-ammonia-water compositions of 30 to 37 weight percent total nitrogen content presents a significant advantage which can be illustrated by reference to a specific composition of the present invention, Composition E, having as shown on FIG. 4 a 33 weight percent total nitrogen content and consisting of 31 weight percent urea, 22.6 weight percent ammonia, and the balance (or 46.4 weight percent) water. According to the correlations of Worthington et al. as to the crystallization properties of the urea-ammonia-water system at 0° C., taken in conjunction with the curves plotted on FIG. 2 relative to the 32° C. isobar, it would be predicted that Composition E would begin to crystallize at 0° C. and boil under atmospheric pressure conditions at a temperature slightly below 32° C., and specifically at about 30° C. These data suggest that the temperature range over which Composition E would exist completely in the liquid state without "salting out" or vaporizing is 0° to 30° C. (32° to 86° F.). On the surface, such a temperature range would seem to allow for use in a variety of agricultural regions without much difficulty. But since liquid fertilizers are ordinarily transported and dispensed from tank trucks and the like, and since a tank absorbs radiant heat energy from the sun, one must take into account the fact that the temperature within the tank during periods of sunshine is substantially higher than the ambient temperature. More specifically, the tank temperature may be up to about 20° F. higher than ambient, so that the 86° F. boiling point of the liquid within the tank is reached when the ambient temperature is only about 66° F. Thus, the effective temperature range over which Composition E can successfully be used in a typical agricultural situation is not 32° to 86° F. but the much narrower range of 32° to 66° F., a result which is unacceptable, since most regions of the country often experience more than a 34° F. temperature differential in a single day, and even more over a growing season.

In contrast, according to the crystallization data set forth in FIG. 4, it has now been discovered that Composition E has, in fact, a crystallization temperature of about −10° C. (14° F.), and not 0° C. (32° F.) as predicted or projected by Worthington et al. Thus, the effective temperature range throughout which the composition will remain in the liquid state in agricultural environments is not the insignificant range of 32° to 66° F. but the much greater range—by more than 50 percent—of 14° to 66° F.

As illustrated by the foregoing discussion, the discovery herein of unexpectedly depressed crystallization temperatures for urea-ammonia-water compositions of 30 to 37 weight percent total nitrogen content significantly expands the temperature range in which the liquid state may be maintained, thereby providing a definite agronomical advantage. But the implications of the depression in crystallization temperatures extend still further. For example, it will be seen in FIGS. 3 and 4 that the crystallization curves in the regions between 30 and 37 weight percent total nitrogen rise to a maximum in the 32 to 34 weight percent region, with the maximums generally relating to compositions having a total nitrogen content of about 33 weight percent. These data indicate that, for the same desired maximum crystallization temperature, and for the same desired total nitrogen content, one may now prepare urea-ammonia-water compositions of greater urea content than indicated by the correlations of Worthington et al., and at the same time provide a composition useful in the completely or essentially completely liquid state over a greater temperature range than predictable from FIGS. 1 and 2. The following Example will illustrate this feature of the invention; however, it is noted that this Example, as with both Examples herein, is illustrative of the invention and not limiting, the invention being defined by the appended claims.

EXAMPLE I

Returning once again to Composition E of 31 weight percent urea, 22.6 weight percent ammonia, and 46.4 weight percent water content, it will be remembered that, although it is now known that Composition E will remain in the liquid state in a vessel or reservoir over the effective temperature range of 14° to 66° F., the prediction according to FIGS. 1 and 2 is that this composition should have been useful as a liquid only over the effective temperature range of 32° to 66° F. In addition, the graph in FIG. 1 predicts that the maximum urea content in a urea-ammonia-water composition of 33 weight percent total nitrogen content which could be tolerated without the crystallization temperature exceeding 32° F. (0° C.) is that of Composition E, which contains 31 weight percent urea, as shown in FIG. 4. But the present Example will show that, contrary to the predictions of FIG. 1, urea contents higher than 31 weight percent can be tolerated in a urea-ammonia-water composition of 33 weight percent total nitrogen content without the crystallization temperature exceeding 32° F.—and with the added advantage of an increased boiling point.

Taking Composition F as exemplary (which Composition F, like Composition E, coincidentally lies at the peak of an inflection in an isothermal crystallization curve in FIG. 4), it will be seen that this Composition F, of 37 weight percent urea content, 19.2 weight percent ammonia content, and 43.8 weight percent water content, not only has a higher urea content than 31 weight percent (in fact, 37 weight percent) and the same total nitrogen content of 33 weight percent, but Composition F also, according to the data in FIG. 4, has a crystallization temperature of 32° F., so that an increased urea content is provided without exceeding the desired 32° F. crystallization temperature. Further, according to the data in FIG. 2, Composition F begins to boil at about 97° F. under atmospheric pressure conditions, and thus the ambient temperature causing boiling in a tank or other storage vessel wherein direct sunshine induces a 20° F. higher temperature within the tank compared to ambient would be 77° F.—11° F. higher than the 66° F. temperature at which Composition E would boil in a similar environment.

In addition, compositions defined by the points lying on the line between points E and F on FIG. 4 also have urea contents greater than 31 weight percent, a nitrogen content of 33 weight percent, a crystallization temperature no greater than 32° F., and a higher boiling point than Composition E. In comparison to Composition F, however, these compositions have the advantage of a lower crystallization temperature but the disadvantages of a higher vapor pressure (and consequently lower boiling point) and a lower urea content.

In view of the preceding description, including the Example, it can be seen that the discovery of unexpected depressions in the crystallization curves for urea-ammonia-water compositions having a total nitrogen content of 30 to 37 weight percent is of practical significance in agricultural environments wherein a fertilizer is required to remain liquid over the greatest possible range of expectable ambient temperatures, and even more especially when the fertilizer is to be relatively concentrated in urea, a "mobile" fertilizer. Preferably, the compositions of the invention employed as a fertilizer in the essentially completely liquid or completely liquid form comprise urea, ammonia, and water in proportions such that the urea content is between 20 and 50 weight percent and the total nitrogen content is at least 30 weight percent but no more than 35 weight percent. More preferred compositions for use as a fertilizer have a urea content between 25 and 45 weight percent and a total nitrogen content between about 32 and about 35 weight percent. These compositions are shown, respectively, by the area defined by polygon ZBCD on FIGS. 3 and 4 and that defined by GHOQ on FIG. 4.

In the most usual embodiment of the invention, a fertilizer composition will be selected according to the climactic environment or environments in which the fertilizer will be introduced. Ordinarily, the fertilizer will be required to avoid crystallization at a specified temperature between −15° C. and +15° C., and most usually between −10° C. and 10° C., with it generally being desired that the fertilizer also have as high a boiling point as possible so that it will remain liquid over the greatest possible temperature span. Among the compositions remaining liquid at a specified temperature between about +10° C. and about +15° C. while also having a high boiling point are those having a total nitrogen content between 30 and 37 weight percent, a total urea content of 45 weight percent or less, and a crystallization temperature no lower than −10° C.; these compositions are represented graphically in FIG. 4 as the area defined by lines IJ, JK, and IL, and curve KML. Among the compositions having relatively high boiling points while also remaining liquid at a specified temperature between 0° and +10° C. are those having a crystallization temperature between 0° and +10° C. and a total nitrogen content between 30 and 37 weight percent, such compositions being represented graphically in FIG. 4 as the area defined by curves KML and NFP and lines KN and LP. Among the compositions having high boiling points while also remaining liquid at a specified temperature between −10° C. and 0° C. are those having a crystallization temperature between −10° C. and 0° C. and a total nitrogen content between 30 and 35 weight percent, such compositions being represented on FIG. 4 as the area defined by curves NFR and TES and lines NT and RS. And compositions having high boiling points while also remaining liquid at a specified temperature between −15° and −10° C. are most usually selected from those compositions having a urea content of at least about 25 weight percent, a crystallization temperature no greater than −10° C., and a total nitrogen content between about 31.5 and 35 weight percent, such compositions being represented on FIG. 4 as the area defined by curve UES and lines UQ and SQ.

To provide the maximum temperature span between the crystallization and boiling point temperatures, and at the same time maximize the urea content, it is apparent from FIG. 4 that those compositions having a total nitrogen content between about 32 and 35 weight percent will meet these two criteria, and this because, as shown in FIG. 4, the maximum depressions (or the peaks in the inflections) of the isothermal crystallization curves for compositions having a urea content between about 25 and 45 weight percent occur when the total nitrogen content is within the 32 to 35 weight percent range, and more particularly within the 32 to 34 weight percent range. Thus, for example, from the data in FIG. 4, the composition providing the maximum temperature span between crystallization and boiling when the desired crystallization temperature is +10° C. is represented by Composition M, while that for a 0° C. desired crystallization temperature is Composition F, and that for a −10° C. desired crystallization temperature is Composition E, all of which compositions have a total nitrogen content between 32 and 34 weight percent. From these data, and other data shown in FIG. 4, it is apparent that, of the urea-ammonia-water compositions having a total nitrogen content between 30 and 37 weight percent, those which provide the most unexpectedly wide temperature span between crystallization and boiling point when the desired crystallization temperature is between −15° C. and about +15° C. have a total nitrogen content between 32 and 34 weight percent, with the maximum usually being achieved at about 33 weight percent.

In general, for any given composition having a total nitrogen content between about 32 and 35 weight percent and a urea content between about 25 and 45 weight percent, i.e., the area defined by polygon GHOQ in FIG. 4, the crystallization temperature as revealed by the data in FIGS. 3 and 4 is usually between 3° and 15° C. lower than that projected or predicted by the graph in FIG. 1. For the most preferred compositions having a total nitrogen content between about 32 and about 34 weight percent and a urea content between about 25 and 45 weight percent, i.e., the area defined by polygon WHOV in FIG. 4, the depression in the crystallization temperature (and thus also the increase in the differential between the crystallization and boiling point temperatures) is typically within the ranges shown in the following table:

TABLE I

| Composition | Decrease in Crystallization Temperature (or Increase in Differential Temperature Between Crystallization and Boiling) |
| --- | --- |
| 32 to 34 wt. % Total Nitrogen plus $\geq$25 to <33 wt. % urea | 7 to 11° C. |
| 32 to 34 wt. % Total Nitrogen plus $\geq$33 to <38 wt. % urea | 10 to 15° C. |
| 32 to 34 wt. % Total Nitrogen plus $\geq$38 to $\leq$45 wt. % urea | 4 to 8° C. |

Because of the depressions in the crystallization temperatures, there are many urea-ammonia-water compositions containing 30 to 37 weight percent total nitrogen—but generally those containing 32 to 34 weight percent total nitrogen—which have relatively large temperature differentials between their crystallization and atmospheric pressure boiling points. Crystallization-boiling point differentials of at least 25° C., even at least 27° C., pertain to many compositions crystallizing at a temperature above +5° C. but no greater than +15° C. while differentials of at least 30° C., often at least 35° C., pertain to many compositions crystallizing at temperatures greater than or equal to −5° C. but no greater than +5° C. And for compositions crystallizing at temperatures greater than or equal to −15° C. but less than −5° C., differentials of at least 35° C., and oftentimes at least 40° C., are obtainable. Typical maximums in the crystallization-boiling point differentials for 30 to 37 weight percent total nitrogen urea-ammonia-water compositions are about 29° C. for compositions crystallizing at > +5° to $\leq$+15° C., about 37° C. for compositions crystallizing at $\geq$−5° to $\leq$+5° C., and about 41° C. for compositions crystallizing at $\geq$−15° C. to <−5° C. Based on the foregoing data, it can be seen that the invention allows for holding, in storage vessels, tank trucks, railroad tankers and the like, a liquid urea-ammonia-water composition of 30 to 37 weight percent total nitrogen content over an unexpectedly wide range of climactic conditions without encountering vaporization or crystallization problems. More specifically, as explained hereinbefore with reference to Composition E, the temperature range over which the solution may be used in the liquid state at atmospheric pressure without crystallizing or without the vapor pressure exceeding atmospheric is substantially greater than is determinable by reference to FIGS. 1 and 2.

When preparing urea-ammonia-water compositions having a total nitrogen content between 30 and 37 weight percent, it is possible to admix an aqueous ammonia solution of sufficient ammonia content and an aqueous urea solution of sufficient urea content such that the resulting urea-ammonia-water composition has a desired total nitrogen content between about 30 and 37 weight percent. Such a method, however, cannot be performed under ambient conditions; either the ammonia solution must be under pressure or the urea solution heated, or both, to produce the desired 30 to 37 weight percent total nitrogen urea-ammonia-water composition. Moreover, this method suffers from an unfavorable energy balance: the aqueous ammonia solution admixed with the urea solution is generally prepared with cooling means to control the exothermic heat generated by the dissolution of ammonia in water, while the preparation of the aqueous urea solution generally requires a boiler or other heat source to encourage the dissolution of urea into water, an endothermic reaction. Thus, in the preferred method of preparation, which reduces or eliminates the need for heating and/or cooling equipment, gaseous anhydrous ammonia and solid urea are simultaneously dissolved into an aqueous reaction medium, so that one may take advantage of the exothermic nature of the ammonia-water dissolution to aid the dissolution of urea. Taking this concept one step further, one may so adjust the amounts of urea and ammonia being simultaneously dissolved that the dissolution proceeds in part or totally under isothermal or essentially isothermal conditions, and in one embodiment of the invention, urea and ammonia are dissolved simultaneously and isothermally in an aqueous reaction medium over a time period sufficient to increase the total nitrogen content of said medium by 10 weight percent, often by 15 weight percent. Ordinarily, however, it is not necessary to control the temperature conditions to truly isothermal conditions, or even to an approximation of isothermal conditions; usually, so long as, during admixing, the temperature of the admixed ingredients does not vary by more than 20° C. (36° F.) from the initial temperature (usually the ambient temperature), the need for cooling and/or heating equipment may be minimized or avoided. Thus, in an alternative embodiment of the invention, the temperature of the admixed ingredients varies from the initial by no more than 10° C. (18° F.), and more preferably by no more than 5° C. (9° F.), by alternately contacting the aqueous reaction medium (usually water or an aqueous solution of urea and/or ammonia) with anhydrous ammonia and then solid urea, with all or a substantial proportion of the heat required for urea dissolution being provided by the previous dissolution of ammonia, and with the amounts of dissolved urea and ammonia being controlled so that the reaction temperature fluctuates within the predetermined range. In yet another embodiment, the foregoing preparation methods are modified by supplemental additions of aqueous ammonia and/or aqueous urea to the reaction medium, but due to the unfavorable energy balance in producing aqueous urea and aqueous ammonia, such supplemental additions are preferably minimized, as are supplemental additions of heat and/or cooling energy.

When employed as a fertilizer, the urea-ammonia-water compositions herein may be applied to the soil by any method typically employed for distributing a liquid fertilizer. Bulk spreading, as from an airplane, is one method; yet another is by injection, wherein a tractor or other vehicle is employed to tow a device for injecting a liquid fertilizer into the soil to a desired depth and at desired injection spacings. The preferred method, however, is irrigation, as for example, by flood, drip, or sprinkler irrigation. Generally, the fertilizer is applied to the soil such that 10 to 500 pounds of total nitrogen are distributed per acre of soil, most frequently 75 to 125 pounds per acre.

One unusual feature of the invention is that 30 to 37 weight percent total nitrogen urea-ammonia-water compositions have been found to be superior to other nitrogen fertilizers when distributed on the soil in equivalent or essentially equivalent pounds of absolute total nitrogen per acre. As an illustration, it will now be shown in the following Example II how a 35 weight percent urea-ammonia-water composition of the invention proves superior as a fertilizer to a more costly urea-ammonium nitrate-water composition distributed upon the soil in essentially equivalent pounds of absolute total nitrogen per acre. (As used herein, "total nitrogen" refers to the nitrogen present due to dissolved urea and ammonia exclusively; "absolute total nitrogen" refers to the nitrogen present from all sources, as for example, urea, ammonium ion, and nitrate ion in the case of a urea-ammonium nitrate-water composition. It is further noted that the 30 to 37 weight percent total nitrogen compositions useful as fertilizers in the invention are preferably essentially free of such nitrogen sources as ammonium ion, nitrate ion, and the like, so that, for such preferred compositions, the total nitrogen and the absolute total nitrogen values will be identical or virtually identical.)

EXAMPLE II

A comparative test is run to determine the effectiveness of a urea-ammonia-water fertilizer composition (35-0-0) and a urea-ammonium nitrate-water fertilizer composition (32-0-0) for growing potatoes. The composition of the invention consists essentially of 40.0 weight percent urea, 20.2 weight percent ammonia, and 39.8 weight percent water; the comparative fertilizer consists essentially of 34.8 weight percent urea, 45.7 weight percent ammonium nitrate, and 19.5 weight percent water.

Each fertilizer is sprayed through an overhead sprinkler irrigation system onto four 6.1 acre plots of land, each planted in an identical manner with potato seed. The fertilizers are sprayed on four different days (Day Nos. 1, 5, 9, and 14) for the time periods shown in Table II. Although data pertaining to the amounts of fertilizer (in pounds of absolute total nitrogen spread per acre) are incomplete, it is apparent from the petiole data shown in Table II that the 35-0-0 fertilizer is distributed onto plots 1 to 4 on each of the four days in amounts essentially equivalent in absolute total nitrogen content to the 32-0-0 comparative fertilizer spread on plots 5 to 8. The leaf petiole data also establish that essentially no ammonia was volatilized from the 35-0-0 fertilizer of the invention during spraying, a fact which is confirmed by sensory observations, i.e., there is no smell of ammonia during the sprinkling irrigation on Days Nos. 1, 5, 9, and 14.

TABLE II

| Day No. | Hours of Irrigation | Leaf Petiole, NO$_3$—N—wppm | |
|---|---|---|---|
| | | 35-0-0[1] | 32-0-0[2] |
| 1 | 4 | 24,900 | 24,900 |
| 5 | 4 | 24,000 | 24,000 |
| 9 | 6 | 26,700 | 24,200 |

TABLE II-continued

| Day No. | Hours of Irrigation | Leaf Petiole, NO$_3$—N—wppm | |
|---|---|---|---|
| | | 35-0-0[1] | 32-0-0[2] |
| 14 | 6 | 23,400 | 24,400 |
| 20 | 0[3] | 21,400 | 24,800 |
| 27 | 6[3] | 20,700 | 20,500 |
| 34 | 0 | 1,500 | 3,900 |
| 41 | 0 | 2,700 | 3,700 |
| 48 | 0 | 1,700 | 4,300 |

[1]Based on composite samples taken from the four plots irrigated with the 35-0-0 fertilizer.
[2]Based on composite samples taken from the four plots irrigated with the 32-0-0 fertilizer.
[3]Irrigation with water only.

The results of the comparative experiment are summarized in Table III. The test plots sprayed with the fertilizer of the invention yield over 30 percent more of the highest quality potatoes, U.S. No. 1, while also providing essentially equivalent yields of U.S. Nos. 2, 3, and 4 potatoes. Moreover, even in terms of the total number of potatoes produced (as calculated by summing the totals for all grades of potatoes), the fertilizer of the invention still proves superior, yielding 93,500 pounds of potatoes per acre compared to only 77,200 for the comparative 32-0-0 fertilizer. Thus, from two perspectives —the yield of U.S. No. 1 potatoes and the yield of total potatoes—the efficiency of urea-ammonia-water fertilizers containing between about 30 and 37 weight percent total nitrogen for increasing the yield of agricultural crops is proven.

TABLE III

| POUNDS OF POTATOES PER ACRE[1] | | | | | |
|---|---|---|---|---|---|
| Fertilizer Composition | Plot | U.S. No. 1 | U.S. No. 2 | U.S. No. 3 (Bakers) | U.S. No. 4 (Culls) |
| 35-0-0 | 1 | 16,900 | 3,100 | 2,800 | 500 |
| 35-0-0 | 2 | 19,300 | 4,400 | 4,300 | 300 |
| 35-0-0 | 3 | 8,000 | 5,500 | 2,900 | 300 |
| 35-0-0 | 4 | 10,400 | 2,200 | 2,400 | 600 |
| | Totals | 54,600 | 15,200 | 12,400 | 1,300 |
| | Average | 13,700 | 3,800 | 3,100 | 300 |
| 32-0-0 | 5 | 3,300 | 5,300 | 3,400 | 300 |
| 32-0-0 | 6 | 9,400 | 500 | 2,700 | 700 |
| 32-0-0 | 7 | 4,000 | 2,900 | 1,700 | 700 |
| 32-0-0 | 8 | 3,400 | 5,600 | 3,200 | 100 |
| | Totals | 41,100 | 15,300 | 11,000 | 800 |
| | Average | 10,300 | 3,800 | 2,800 | 500 |

[1]Based on random samplings in 0.001 acre areas of the plots.

In addition to providing superior crop yields to urea-ammonium nitrate-water compositions, the invention provides yet another advantage, namely, the compositions of the invention are relatively non-corrosive to mild steel and the like whereas urea-ammonium nitrate-water compositions are known to be highly corrosive.

In view of the foregoing, therefore, it can be seen that the urea-ammonia-water compositions of the present invention, when prepared to have a total nitrogen content between about 30 and 37 weight percent (or within a desired range therebetween, as for example, 30 to 36, 31 to 35, 32 to 36, or 31 to 36 weight percent), have advantageous properties as a fertilizer, with the advantages increasing as the total nitrogen content increases above 30 weight percent or decreases below 37 weight percent into the range of 32 to 34 weight percent.

Although the invention has been described in conjunction with illustrative examples and preferred embodiments thereof, it is apparent that the invention is capable of many modifications, alternatives, and variations. Accordingly, it is intended to embrace within the invention all such modifications, alternatives, and variations as may fall within the spirit and scope of the appended claims.

I claim:

1. A liquid composition consisting essentially urea, ammonia, and water wherein the weight percentages of each component are included within the area bounded by lines PA, AB, BC, CD, DR, and curve RP of FIG. 3.

2. A composition as defined in claim 1 wherein said composition consists essentially of urea, ammonia, and water, with the weight percentage of total nitrogen being between about 30 and 35 weight percent.

3. A composition as defined in claim 1 or 2 wherein the maximum urea content is 45 weight percent and the crystallization temperature of the composition is $+10°$ C. or greater.

4. A composition as defined in claim 1 or 2 wherein the crystallization temperature of the composition is between $0°$ and $+10°$ C.

5. A composition as defined in claim 1 wherein the crystallization temperature of the composition is between $-10°$ C. and $0°$ C.

6. A composition as defined in claim 1 wherein the crystallization temperature is below $-10°$ C. and the urea content is at least 25 weight percent.

7. A liquid fertilizer composition consisting essentially of urea, ammonia, and water, said composition having a total nitrogen content of at least 30 weight percent but no greater than 35 weight percent, and further having a urea content between about 25 and 45 weight percent.

8. A composition as defined in claim 7 wherein said total nitrogen content is between about 32 and 35 weight percent.

9. A composition as defined in claim 8 having a crystallization temperature between about $0°$ and $+10°$ C.

10. A composition as defined in claim 8 having a crystallization temperature above about $+10°$ C.

11. A composition useful as a fertilizer consisting essentially of an essentially completely liquid mixture of urea, ammonia, and water, said composition having a total nitrogen content between about 32 and 34 weight percent and a urea content between about 20 and 50 weight percent.

12. A composition as defined in claim 11 having a urea content between about 25 and 45 weight percent.

13. A composition useful as a fertilizer consisting essentially of a liquid admixture of urea, ammonia, and water containing between about 30 and 37 weight percent total nitrogen, said composition having a crystallization temperature between and including $-5°$ and $+5°$ C. and a vapor pressure such that the temperature differential between the crystallization and boiling point of said composition at atmospheric pressure is at least $30°$ C.

14. A composition as defined in claim 13 wherein said differential is at least $35°$ C.

15. A composition as defined in claim 13 or 14 wherein the maximum temperature differential is $37°$ C.

16. A composition useful as a fertilizer consisting essentially of a liquid admixture of urea, ammonia, and water containing between about 30 and 37 weight percent total nitrogen, said composition having a crystallization temperature greater than $+5°$ but no greater than $+15°$ C. and a vapor pressure such that the temperature differential between the crystallization and boiling point of said composition at atmospheric pressure is at least $25°$ C.

17. A composition as defined in claim 16 wherein said differential is at least $27°$ C.

18. A composition as defined in claim 16 wherein the maximum temperature differential is $29°$ C.

19. A composition useful as a fertilizer consisting essentially of a liquid admixture of urea, ammonia, and water containing between about 30 and 37 weight percent total nitrogen, said composition having a crystallization temperature of at least $-15°$ but less than $-5°$ C. and a vapor pressure such that the temperature differential between the crystallization and boiling point of said composition at atmospheric pressure is at least $35°$ C.

20. A composition as defined in claim 19 wherein said differential is at least $40°$ C.

21. A method for preparing a urea-ammonia-water composition comprising (1) contacting an aqueous liquid reaction medium with anhydrous ammonia and admixing urea in amounts sufficient to produce a liquid composition consisting essentially of urea, ammonia, and water with a total nitrogen content between about 30 and 37 weight percent, said contacting and admixing being under conditions preventing the temperature of the aqueous medium from differing from its initial temperature by more than $20°$ C. and (2) recovering said liquid composition.

22. A method as defined in claim 21 wherein said temperature differs from said initial temperature by no more than $10°$ C.

23. A method as defined in claim 21 wherein said temperature differs from said initial temperature by no more than $5°$ C.

24. A method as defined in claim 21 wherein said contacting and said admixing are, for at least a portion of the time during which the composition is prepared, carried out simultaneously.

25. A method as defined in claim 24 wherein said contacting and admixing are carried out essentially isothermally for a substantial period of time.

26. A method as defined in claim 24 wherein said contacting and admixing are carried out essentially isothermally while the aqueous liquid reaction medium increases in total nitrogen content by 10 percent by weight.

27. A method as defined in claim 21 wherein said contacting and said admixing are carried out alternately.

28. A method as defined in claim 21 wherein essentially all heat generated by said contacting of anhydrous ammonia with said aqueous liquid reaction medium is employed to dissolve said admixed urea.

29. A method as defined in claim 21 wherein at least some of the heat generated by said contacting of anhydrous ammonia with said aqueous liquid reaction medium is employed to dissolve said admixed urea.

30. A fertilizing method for growing plants comprising distributing upon a soil an essentially completely liquid composition comprising urea, ammonia, and water wherein the total nitrogen content due to dissolved urea and ammonia exclusively is between about 30 and 37 weight percent.

31. A method as defined in claim 30 wherein said liquid composition contains between about 31 and 36 weight percent total nitrogen.

32. A method as defined in claim 30 wherein said liquid composition comprises between 25 and 45 weight percent urea.

33. A method as defined in claim 30 or 32 wherein said composition contains between about 32 and 34 weight percent total nitrogen.

34. A method as defined in claim 30 wherein said composition contains between 31 and 35 weight percent total nitrogen.

35. A method as defined in claim 30 wherein said composition contains between about 32 and 35 weight percent total nitrogen.

36. A method as defined in claim 30, 31, or 35 wherein said composition consists essentially of urea, water, and ammonia, and the urea content is between about 25 and 45 percent by weight.

37. A method as defined in claim 30 wherein the urea content of said composition is between 20 and 50 weight percent.

38. A liquid fertilizer composition comprising urea, ammonia, and water, said composition having a total nitrogen content due to dissolved urea and ammonia exclusively of at least 30 weight percent but no greater than 35 weight percent, and further having a urea content between about 25 and 45 weight percent.

39. A composition as defined in claim 38 wherein said total nitrogen content is between 32 and 35 weight percent.

40. A composition as defined in claim 38 having a crystallization temperature between about 0° and +10° C.

41. A composition as defined in claim 38 having a crystallization temperature above about +10° C.

42. A composition as defined in claim 38 having a crystallization temperature above about 0° C.

43. A composition as defined in claim 38 having a crystallization temperature between −5° and +5° C.

44. A liquid fertilizer composition comprising urea, ammonia, and water, said composition having a total nitrogen content due to dissolved urea and ammonia of at least about 30 but no more than about 37 weight percent, and further having a urea content between about 20 and 50 weight percent, said composition having a crystallization temperature at or above 0° C. when the composition has a 35 to 37 weight percent total nitrogen content.

45. A fertilizing method for providing nutrients to plants, said method comprising distributing upon a soil the composition defined in claim 1, 2, 5, 6, 7, 9, 10, 11, 13, 14, 15, 16, 18, 19, 20, 38, 44, 39, 40, 41, 42, or 43.

* * * * *